Oct. 27, 1970 — A. PEIPERL — 3,535,805
DISPLAY DEVICE
Filed April 26, 1968 — 2 Sheets-Sheet 1

INVENTOR
Adam Peiperl
BY A. Fred Starobin
ATTORNEY

Oct. 27, 1970   A. PEIPERL   3,535,805
DISPLAY DEVICE
Filed April 26, 1968   2 Sheets-Sheet 2
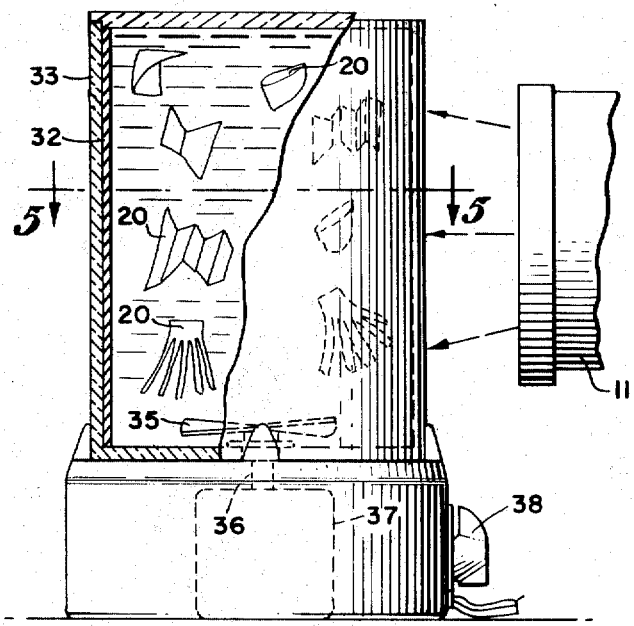
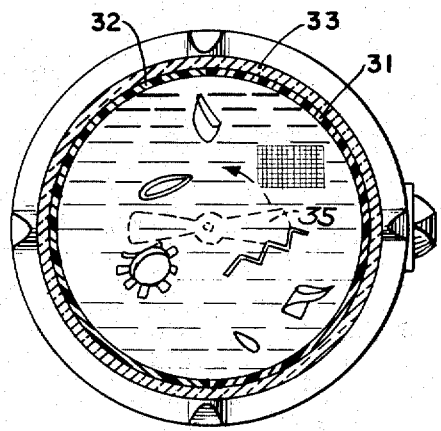
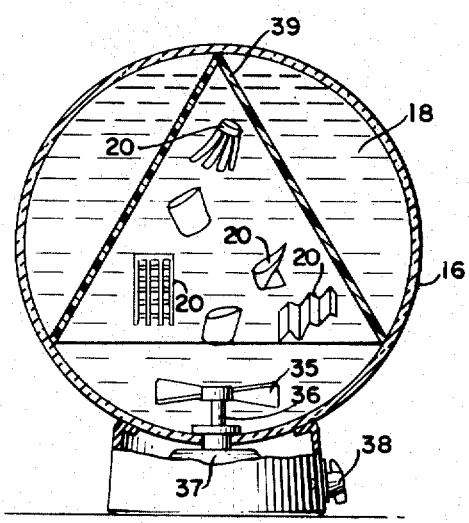
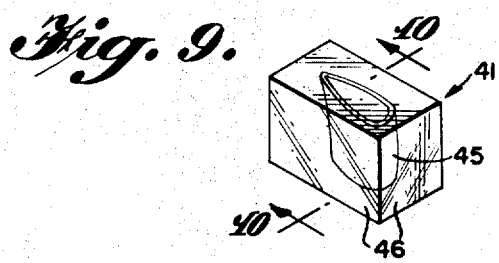
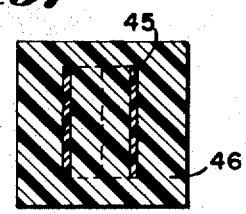
INVENTOR
Adam Peiperl
BY *A. Fred Starobin*
ATTORNEY

United States Patent Office 3,535,805
Patented Oct. 27, 1970

3,535,805
DISPLAY DEVICE
Adam Peiperl, 1135 Loxford Terrace,
Silver Spring, Md. 20901
Filed Apr. 26, 1968, Ser. No. 724,356
Int. Cl. G09f 13/24
U.S. Cl. 40—106.21
17 Claims

ABSTRACT OF THE DISCLOSURE

A display device formed of linearly birefringent material such as wave plate or retardation sheet cutouts such as cellophane or polystyrene, some with three-dimensional shapes, in a moving liquid between polarizing sheets with a light beam shining therethrough.

---

The present invention relates to display devices and in particular to a device utilizing optical means to produce aesthetic effects.

It is an object of the present invention to produce optical effects involving multicolored figures slowly moving in a circular path while constant change of color of the figures takes place. Such devices may be useful in attracting attention in advertising devices or as room decorations for their aesthetic effect. It has been found that the speed of movement of the figures contributes to the particular mood desired and that a slow steady movement actually contributes to a pleasant relaxed atmosphere.

Basically the display device of the present invention uses birefringent forms floating in a liquid being constantly stirred and which is lighted so as to pass the light through a polarizing sheet, the figures, and a second polarizing sheet. The polarizing sheets may be fixed at different polarization axial relationships to each other or one of the sheets may be mounted to rotate thus constantly changing the axial relationship of the polarizing sheets to each other.

A complete understanding of the invention may be had from the following description of the different embodiments of the invention. In the description, reference is made to the accompanying drawings in which:

FIG. 4 is a partially sectioned view of another embodiment of the present invention;

FIG. 5 is a partially sectioned plan view of a portion of FIG. 4;

FIG. 6 is a partially sectioned view of a portion of still another embodiment of the present invention;

FIG. 7 is a perspective view of a form for floating in the liquid in another embodiment of the invention;

FIG. 8 is a sectioned view of FIG. 7 along line 8-8;

FIG. 9 is a perspective view of another form for the embodiment contemplated by the form in FIG. 7; and FIG. 10 is a sectioned view of FIG. 9 along line 10-10.

Figure 1:
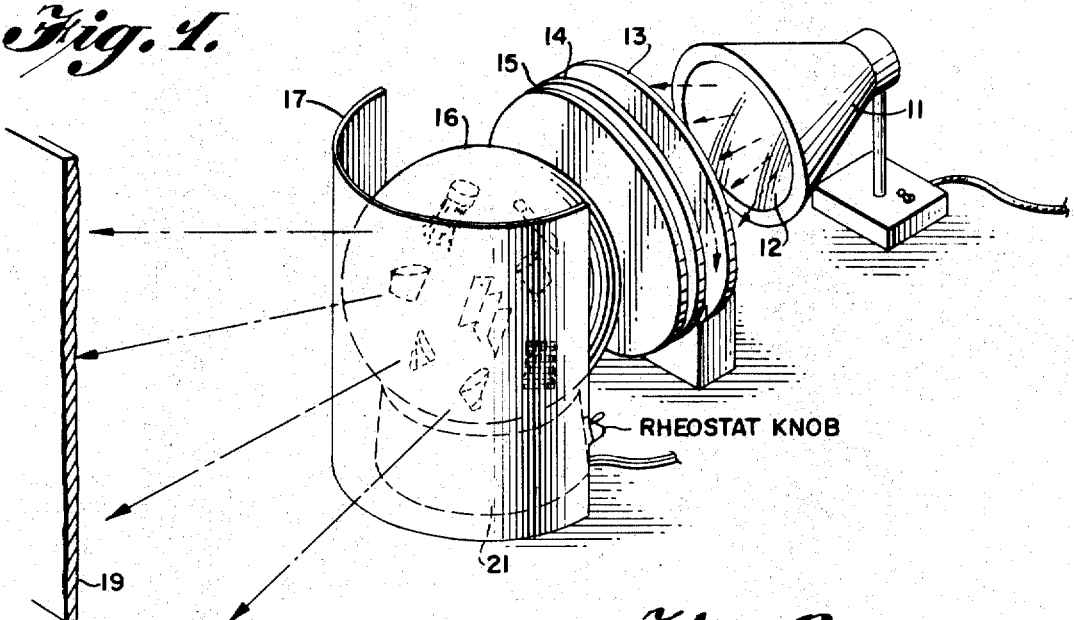
FIG. 1 is a perspective view of one embodiment of the present invention.
Figure 2:
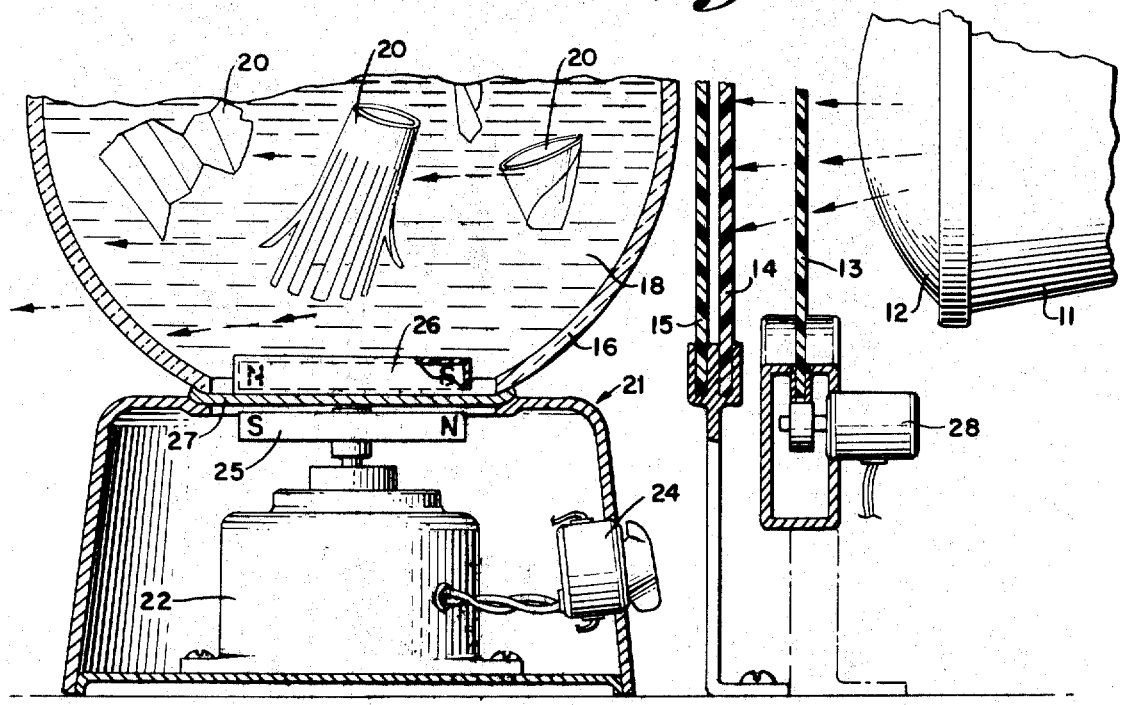
FIG. 2 is an enlarged partially sectioned elevational view of a portion of the embodiments of FIGS. 1 and 3.

Referring first to FIG. 1 and to the details of FIG. 1 shown in an enlarged partially sectioned portion shown in FIG. 2, there is shown a light source 11 with a diffusing screen 12 which shines light in a path through polarizing filter 13 and colored cellophane filters 14 and 15, through spherical flask 16 and curved polarizing filter 17. Floating in a liquid 18 are forms 20 made of linearly birefringent material such as wave plates or retardation sheets, within which category are materials such as oriented plastics (i.e. cellophane or polystyrene sheets), or split mica sheets which are preferably formed into a variety of three-dimensional shapes, and also overlays of two-dimensional patterns as shown in the various figures.

Since the optical display of colors is enhanced by movement, preferably a slow and steady movement, the forms 20 are kept moving by movement of liquid 18 which is stirred by a magnetic stirrer 21 which consistes of an electric motor 22 having its speed controlled by rheostat 24. The motor 22 rotates a magnet 25 which causes the rotation of magnet 26 located within flask 16 but still within the magnetic field of magnet 25. Magnet 26 is sheathed in a glass or plastic cover so that the metal is not affected by the liquid 18. In the embodiment shown, the flask 16 has been sealed by plate 27 after being filled with liquid 18 and having forms 20 inserted therein. Sheathed magnet 26 rests on this flat portion and spins thereon to stir liquid 18. Use of rheostat 24 allows the stirring speed of liquid 18 to be varied in order to obtain the most desirable effects. Once a speed is found which gives an agreeable effect, that speed may be maintained. In fact, the device may be made so as to run at only one set speed and the adjustment means would then not be necessary.

The liquid 18 may be water or some other clear liquid having a viscosity to allow sufficient buoyancy for the forms 20 to float therein and not drop to the bottom or gather at the top of flask 16. A preservative to prevent the formation of molds should be added to liquid 18 when the liquid is of the type requiring such treatment, such as water.

The changing light and color effects may be enjoyed in a variety of ways. An observer may look into flask 16 by looking through curved polarizing filter 17 as shown, or a flat piece of polarizing sheet material, or he may be in a room where the colored light shines onto a wall or screen 19 and possibly onto the ceiling of the room also. In another way of observing the phenomena, polarizing filter 17 may be eliminated and the observer may look into flask 16 while wearing polarizing glasses 29 as in FIG. 3.

Figure 3:
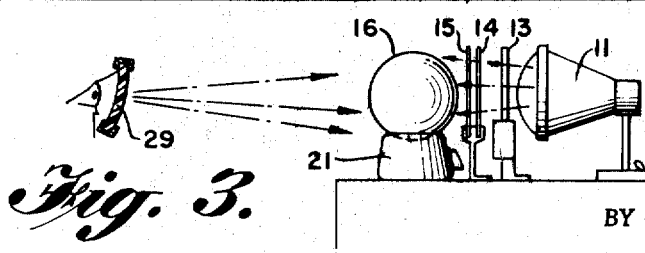
FIG. 3 is an elevational view of a modified embodiment of the form of the present invention illustrated in FIG. 1.

Since the variety of colors is formed by the relationship of the axis of polarization of polarizing filters 13 and 17 or 29 to each other, this variation may be enhanced by the changing of this relationship. As shown in FIGS. 1–3, and in greater detail in FIG. 2, this relationship of axes of polarization may be kept continually changing by the rotation of filter 13 by motor 28 through a connection between filter 13 and motor 28.

Although the polarizing filters 13 and 17 or 29 will produce a background of varying brightness depending upon the polarization axial relationship between the filters, the aesthetic effect may be further enhanced through the use of colored cellophane filters 14 and adding more color to the background. Since these cellophane filters 14 and 15 are also wave plates they can also increase the variety of coloring present. Further color changes may occur by the rotation of filters 14 and 15 either manually or by a continuous rotating system such as that shown for polarizing filter 13.

The source of light 11 in FIGS. 1–3 as an electric light with a diffusing screen 12 may be changed for other sources of light. As one alternative the flask, forms and polarizing filters may be placed so that daylight from a window can be the light source required.

In FIGS. 1–3 the flask 16 for containing liquid 18 and forms 20 has been made with its opening covered by plate 27 bonded to flask 16 and with this opening located at the bottom of flask 16. This form of the invention allows the presentation of a container for liquid 18 and forms 20 somewhat like a crystal ball for decorative appearances. But the opening could alternatively be located in the top of the flask and through the use of a frame would not be visible to the observer Also, a screw type cap or cork could be used instead of a bonded plate to close the opening and it is not a necessity that the top should even be closed except that this is preferred in order to prevent dirt or other foreign particles from entering the flask The container for holding the liquid 18 and forms 20 may have other shapes than the spherical shape of flask 16. For example, the container may have the shape of a cylinder as in FIG. 4. In such a case, the cylindrical container may itself be made of polarizing sheets curved and bonded together with top and bottom of polarizing or other material or may be curved polarizing sheets 31 and 32 being the cylindrical walls of a glass cylindrical container 33 or bonded thereto as illustrated in FIG. 4. The polarizing material may be coated on the container itself in whatever shape the container may have.

As shown in FIGS. 4 and 5, two sheets 31 and 32 of polarizing material may be used with the sheets having their axes of polarization at an angle to each other to create a darker background without additional colored filters between light sources 11 and glass container 33. Other types of stirrers may be used such as the type illustrated in FIGS. 4 and 6 wherein a stirring vane 35 is mounted on a shaft 36 which passes through a seal to motor 37 which may have a rheostat speed control 38.

FIG. 6 discloses still another embodiment of the present invention. A light source is used and colored cellophane filters may or may not be used, depending upon the effect desired. Forms 20 are in a liquid 18 in a spherical flask 16, but the polarizing material is in the shape of a cone 39 located within the flask 16. The forms are best confined within cone 39 and the stirrer vanes 35 are also located so as to affect the liquid 18 within the confines of cone 39.

The forms 20 can take any of a variety of shapes. For best effects some forms should have bends therein and others may be composed of several noncoinciding superimposed layers, since the resulting different thicknesses of the wave plates will produce the great variety of changing colors under the effect of the polarizing filters. Some forms which have very colorful effects have been illustrated such as accordion pleated forms, those with thin streamers which change their curvature due to the water motion, grating shaped forms where thin cross streamers intersect, and irregular shaped conical sections. These are illustrative of some of the many forms possible and will give a great variety of changing colors. These forms can be used to give an aesthetic effect even without the polarizing filters shown by coloring of the forms and placing them in a clear or colored liquid. But if it is desired to obtain the polarizing effect without polarizing sheets or cones as shown in the figures, then forms of a type such as forms 40 and 41 may be used.

Forms 40 and 41 are illustrated respectively in perspective views in FIGS. 7 and 9 and in section views in FIGS. 8 and 10. In FIGS. 7 and 8 a curved retardation sheet 42 is cemented or otherwise enclosed between polarizing sheets 43 and 44 to produce a form 40 which can be floated in a clear liquid in a spherical or other shaped flask and still have the varicolored effect of the previous embodiments. In a similar manner, a wave plate form 45 is encased in a casing having walls 46 of polarizing material. These forms 40 and 41 are merely illustrative of the manner in which substantially flat, but curved forms, and three-dimensional forms may be individually encased in polarizing material so as to be used in the present invention.

Additional variations of the present invention may be made and included within the basic form of the invention. Other types of light sources may be used and, furthermore, additional sources of light (such as coming from below the flask) may be used with the primary source illustrated to produce other varied color effects.

It will be obvious to those skilled in the art that various changes may be made without departing from the scope of the invention and the invention is not to be considered limited to what shown in the drawings and described in the specification.

What is claimed:
1. A display device comprising:
   a container,
   fluid in said container,
   birefringent sheet forms floating in said fluid,
   means to cause motion of said fluid and said forms floating therein,
   a source of light directed into said container,
   and polarizing filter material located on opposite sides of said forms and in the path of light from said source of light.
2. The display device of claim 1, further characterized by:
   said polarizing filter material forming, at least in part, the walls of said container whereby said container is made in part at least of said polarizing filter material.
3. The display device of claim 2, further characterized by:
   said container being a cylinder.
4. The display device of claim 1, further characterized by:
   said polarizing filter material being on opposite sides of separate ones of said forms.
5. The display device of claim 1, further characterized by:
   said forms having surfaces superimposed on each other in noncoinciding layers.
6. The display device of claim 1, further characterized by:
   at least a portion of said fluid being a liquid, and
   means to vary and speed of motion of said liquid.
7. The display device of claim 1, further characterized by:
   said container having substantially the shape of a sphere.
8. The display device of claim 1, further characterized by:
   said polarizing filter material including;
      a first polarizing filter between said source of light and said container, and
      a second polarizing filter on the opposite side of said container.
9. The display device of claim 8, further characterized by:
   at least one wave plate filter between said first polarizing filter and said container.
10. The display device of claim 9, further characterized by:
    means to rotate at least one of said polarizing filters, said means to rotate connected to said at least one filter.
11. The display device of claim 9, further characterized by:
    at least one of said filters mounted for rotary motion.
12. The display device of claim 1, further characterized by:
    a screen having a portion thereof located on the opposite side of said container from said light source positioned to receive light reflected from said forms.
13. The display device of claim 1, further characterized by:
    said container having a cylindrical shape positioned with the cylinder resting on its base,
    said polarizing filter material including;
       a first sheet of polarizing material curved to fit contiguous to substantially one-half of the curved wall of said cylindrical shape, and
       a second sheet of polarizing material curved to fit contiguous to substantially the remaining half of the curved wall of said cylindrical shape,
    said first and second sheets positioned with their polarizing axes at an angle to each other.

14. The display device of claim 1, further characterized by:
  said polarizing filter material including;
    a first polarizing filter between said source of light and said container, and
    a second polarizing filter in the form of eyeglasses worn by an observer of the display device positioned substantially on the opposite side of said container.

15. The display device of claim 1, further characterized by:
  said polarizing filter material having the shape of a cone.

16. The display device of claim 15, further characterized by:
  said container having substantially the shape of a sphere, and
  said conical shaped polarizing filter material located within said spherical shaped container.

17. The display device of claim 1, further characterized by:
  said polarizing filter material formed by coating on said container.

References Cited

UNITED STATES PATENTS

| | | |
|---|---|---|
| 2,977,845 | 4/1961 | Boone. |
| 3,239,956 | 3/1966 | Canonica 40—106.45 |
| 3,321,905 | 5/1967 | Krebs. |
| 3,451,751 | 6/1969 | Stock 350—159 X |

FOREIGN PATENTS

| | | |
|---|---|---|
| 942,856 | 5/1956 | Germany. |

EUGENE R. CAPOZIO, Primary Examiner

R. CARTER, Assistant Examiner

U.S. Cl. X.R.

40—130; 350—157, 159

UNITED STATES PATENT OFFICE
CERTIFICATE OF CORRECTION

Patent No. 3,535,805          Dated October 27, 1970

Inventor(s) ADAM PEIPERL

It is certified that error appears in the above-identified patent and that said Letters Patent are hereby corrected as shown below:

IN THE SPECIFICATION:

Column 2, line 6, change "consistes" to --consists--;
Column 2, line 58, before "in" insert --shown--;
Column 2, line 71, after "observer" insert a period.

Column 3, line 4, after "flask" insert a period;
Column 3, line 20, change "sources" to --source--.

IN THE CLAIMS:

Claim 6, line 4 of claim, delete "and" and insert --the--.

SIGNED AND SEALED
JAN 19 1971

(SEAL)
Attest:

Edward M. Fletcher, Jr.
Attesting Officer

WILLIAM E. SCHUYLER, JR.
Commissioner of Patents